United States Patent [19]
Mullan

[11] Patent Number: 5,493,564
[45] Date of Patent: Feb. 20, 1996

[54] METHOD AND APPARATUS FOR GLOBAL ROUTING OF ELECTRONIC MESSAGES

[75] Inventor: John A. Mullan, Burke, Va.

[73] Assignee: Sprint International Communications Corp., Reston, Va.

[21] Appl. No.: 217,907

[22] Filed: Mar. 25, 1994

[51] Int. Cl.$^6$ .................................................. H04L 12/58
[52] U.S. Cl. .................. 370/54; 370/58.2; 370/92; 379/94; 379/220; 340/825.53
[58] Field of Search .................. 370/54, 58.2, 110.1, 370/60, 92, 58.1, 58.3; 379/93, 220, 90, 94; 340/825.52, 825.53

[56] References Cited

U.S. PATENT DOCUMENTS

| | | | |
|---|---|---|---|
| 5,249,178 | 9/1993 | Kurano et al. | 370/60 |
| 5,271,010 | 12/1993 | Miyake et al. | 370/79 X |
| 5,309,430 | 5/1994 | Verhille et al. | 370/60 |

OTHER PUBLICATIONS

Telemail® System marketing pamphlet, Sprint, 1992.
TPX400™ marketing pamphlet, Sprint, 1992.
The International Telegraph and Telephone Consultative Committee (CCITT), Red Book—vol. VIII, "Data Communication Networks: Message Handling Systems," Oct. 8–19, 1984, pp. 3–39.

*Primary Examiner*—Douglas W. Olms
*Assistant Examiner*—Russell W. Blum
*Attorney, Agent, or Firm*—Kenyon & Kenyon

[57] ABSTRACT

A method and apparatus for global routing of electronic messages includes maintaining external and internal address information for each user of a messaging system, along with means for associating the external and internal address for any given user. Upon receipt of a signal embodying a message, the messaging system accesses a conversion table to translate the external address for the recipient to its associated internal address. Similarly, for messages being sent to outside recipients, the messaging system accesses a conversion table to translate the internal address for the originator of the message to an associated external address. For messages sent between users of the same system where the originator specifies an external address for the intended recipient, a dual translation may be performed to convert the internal originator address to an external address and the external recipient address to an internal address. Global routing is thus facilitated by freeing system users from having to maintain information about the internal addressing scheme of either their own or other electronic messaging systems.

22 Claims, 5 Drawing Sheets

| 11 | | | | | | |
|---|---|---|---|---|---|---|
| | X.400 Address | | | | | |
| | 12 Country | 13 ADMD | 14 PRMD | 15 Org Name | 16 Personal Name | 17 Org Units [4] | 18 Domain Defined Units [4] |
| | Char 6 | Char 12 | Char 12 | Char 12 | Char 12 | Char 12 [4] | Char 12 [4] |

Fig. 2

Inbound Conversion Table Entry

| 36 Ext-Ctry | 37 Ext - ADMD | 39 Int-Ctry | 40 Int-ADMD |
|---|---|---|---|
| Char 6 | Char 12 | Char 6 | Char 12 |

Outbound Conversion Table Entry

| 42 Int-Ctry | 44 Int-Org | 46 Ext-Ctry | 47 Ext-ADMD |
|---|---|---|---|
| Char 6 | Char 12 | Char 6 | Char 12 |

Fig. 5

METHOD AND APPARATUS FOR GLOBAL ROUTING OF ELECTRONIC MESSAGES

BACKGROUND OF THE INVENTION

The invention relates to the field of electronic messaging, and specifically to an improved method for global routing of messages within and between electronic messaging systems. Electronic messaging is an increasingly popular mode of communications for a wide variety of corporate, government and private sector users. Rapid advances in telecommunications technology have led to equally rapid development of electronic messaging systems to take advantage of new capabilities. Current electronic messaging systems provide the ability to instantaneously transfer information between users anywhere in the world.

An electronic messaging system of a type to which the present invention is directed comprises two major components: a message handling system (MHS) and a message transfer system (MTS). These two components may reside in software executing on a single minicomputer, such as a "DATA GENERAL AVIION" Model 5250 multi-user server. Alternatively, separate minicomputers may be dedicated to each component.

The message handling system performs message processing functions, providing users with the ability to compose messages to be sent to others and the ability to read messages received from others. The MHS may include several submodules performing the function of user agents (UAs) servicing discrete groups of users. Users might typically be grouped by physical location, organization, division and so on. Each user agent includes software enabling the individual users to communicate with the messaging system. Each user has access to a user interface, typically being a personal computer such as an "IBM PS/2 MODEL 70". The user interface communicates with the user agents either directly, via a data line such as RS-232 cable, or indirectly, via a telecommunications line and a modem. An example of a message handling system of this type is the "TELEMAIL" system developed and marketed by "SPRINT INTERNATIONAL".

The message transfer system performs telecommunications switching functions, determining the ideal routing path for a message and transmitting the message along that path. The MTS may include several message transfer agents (MTAs) which communicate with the various user agents of the message handling system. Each MTA is capable of providing message routing functions for one or more user agents, and may be flexibly configured depending on the needs of any particular installation. For example, a message transfer system may contain a first MTA responsible for local delivery of messages (i.e., messages sent between users of the same message handling system) and a second MTA responsible for relaying remote messages (i.e., messages sent between users of two distinct message handling systems). A collection of at least one MTA and zero or more user agents may be referred to as an administration management domain (ADMD). Within an ADMD, user agents obtain message transfer service by interacting with an MTA through submission and delivery procedures. An example of a message transfer system of this type is the "TPX400" system developed and marketed by "SPRINT INTERNATIONAL".

A message transfer system will typically access a routing information data store which associates physical or logical telecommunications paths with particular user addresses. In a typical prior art messaging system, routing information is stored as a hierarchical tree structure containing a number of increasingly-specific levels of classifications, culminating with individual users at the lowest level. For each user defined to the system, the routing information associates an identifier with a telecommunications path that must be followed to send a message to that user. Alternatively, routing information may be stored in an efficient database structure providing quick and efficient access to routing paths for defined users through the use of search keys. Such a routing scheme is described in the U.S. patent application entitled "Method and Apparatus for Routing Messages in an Electronic Messaging System", filed by John A. Mullan et al. on the same day as the present application, the disclosure of which is incorporated herein by reference.

To illustrate how a message may be composed and routed by an electronic messaging system configured as above, assume a user wishes to send a message to another user at a remote location serviced by a different electronic messaging system. The first user, referred to as a message originator, would compose a message on a user interface using editing functions provided by a user agent. When the user is satisfied with the message and requests that it be sent, the user agent transmits the message as a digital signal to the message transfer agent servicing that particular user agent. Upon receiving the message, the message transfer agent analyzes the address specified for the recipient and determines the appropriate routing path from the routing information data store. Assuming a routing path exists, the message transfer agent transmits the message along an associated telecommunications line to the electronic messaging system servicing the intended recipient.

One of the principal challenges for designers of electronic messaging systems has been providing the ability to route messages between users physically located in different countries and between users of different electronic messaging systems. This ability is referred to generally as "global routing". A primary obstacle to global routing has been the wide variety of messaging systems currently in use, often developed by vendors with their own unique approaches to electronic messaging.

To facilitate global routing, the Consultive Committee for International Telegraphy and Telephony (CCITIT) developed the X.400 series of recommendations in an effort to standardize electronic messaging systems across different countries and vendors. As part of this effort, messages must be formatted and sent using predefined standards and protocols. A message formatted in compliance with X.400 standards must contain certain items of address information, including an originator/recipient name (O/R name) which includes codes for the originator/recipient user's country, administration management domain, organization and personal name.

Although CCITT standards have greatly facilitated global routing, certain problems remain that limit the effectiveness of known electronic messaging systems. As with any mail system, a person desiring to send a message to another person must know the address of the intended recipient. While the CCITT standards dictate the format of this address, system flexibility is inhibited by having to maintain user addresses that are known by other users. The situation is akin to a person who changes residences. Change-of-address information is typically sent to a wide variety of persons with whom the relocating person regularly corresponds. Additionally, the postal service maintains information on the past and present addresses of the relocating person so that any mail sent to the old address may be forwarded to the new address. Similarly, an administrator of an electronic messaging system who changes the system's configuration must ensure that users of the changed system and users of other systems who communicate with those of the changed system are apprised of any resulting changes to user addresses. Even where no change in system configuration occurs, the system administrator must ensure that system users have addresses that are externally known or ascertainable to facilitate both intra- and inter-system communications.

One situation in which this problem clearly manifests itself is where a user of a given electronic messaging system wishes to send a message to another user of that same system who is physically located in another country. The first user, under the CCITT's X.400 standards, must include a country code in the recipient address for the message. Although a user is physically located in one country, for system administration purposes that user may be "located" in an entirely different country (perhaps even the same country as the message originator). To illustrate, assume an electronic messaging system for a large international corporation services users in several different countries in which the corporation has offices. A user in the United States sending a message to a user in Ireland would naturally expect to specify a country code for Ireland (e.g., "IR") in the recipient address. Current telecommunications technology, however, does not preclude a system administrator from configuring the system so that Ireland users are actually serviced by a message transfer agent that also services United States users. In the parlance of the CCITF's X.400 standards, the Ireland users and the United States users reside in the same administration management domain. In this case the proper country code for a deliverable message sent to the user in Ireland would designate the United States (e.g., "U.S."). The potential for confusion among system users is substantial. More importantly, the flexibility of system administrators in configuring their systems is greatly constrained by having to maintain externally-meaningful user addresses (i.e., addresses reflecting the physical location of users).

A second situation in which this problem manifests itself is where a user of an electronic messaging system wishes to send a message to a user of a different electronic messaging system. While conformance to CCITT standards ensures messages can be effectively communicated between the two systems, the problem of having to maintain user addresses recognizable by other users remains. Just as with messages sent between users in different countries, the originating user must know the address of the recipient user in order to successfully route a message to that user. Once again, the need for externally-meaningful addresses limits the flexibility afforded system administrators in configuring their systems.

SUMMARY OF THE INVENTION

The present invention eliminates the need for users of electronic messaging systems to know the actual addresses of other users with whom they communicate, thereby facilitating global routing of messages to an extent not previously possible with prior art messaging systems. The present invention accomplishes this goal through maintenance of a second set of address information for users of an electronic messaging system. Each user is assigned an "external address" known or ascertainable by, and ideally meaningful to, other users. In addition, each user is assigned an "internal address" based on the actual configuration of users within the electronic messaging system. The internal address, not necessarily known by the user, determines how messages are routed to that user by the electronic messaging system. The external address is independent of system configuration, and thus need not be updated to ensure continued addressability by others when the system configuration changes. These external and internal addresses are associated with one another through one or more conversion tables.

The present invention greatly facilitates global routing of messages by providing externally-meaningful addresses that are independent of the actual configuration of an electronic messaging system. Users need only be concerned with the "real world" addresses of other users, as opposed to addresses dictated by system administration considerations. Furthermore, system administrators are relieved of any concerns about keeping users apprised of reconfigurations affecting internal user addresses.

In one embodiment of the present invention, inbound and outbound conversion tables are used to link externally-meaningful and internally-meaningful address information. When an electronic messaging system adapted to use the method and apparatus of the present invention receives a signal embodying a message from another messaging system, the target system parses certain predetermined address information from the recipient address specified in the message. The target system then scans an inbound conversion table for an entry matching the parsed address information. Upon finding a match, associated internal address information from the table entry is substituted for the external information in the message. The target system is then able to route the message to the appropriate user based on this revised, internally-meaningful address. Similarly, when a user of the electronic messaging system is sending a message to an external user (e.g., a user of a different messaging system), the source system parses predetermined address information from the internally-meaningful originator address included in the message and converts that address to one that is meaningful to external users using an outbound conversion table.

This embodiment of the present invention additionally relieves users of an electronic messaging system from having to know the internal addresses for other users of the same system, which is especially advantageous when a system services users located in remote geographic locations. When a message is sent between two users of the same system, the originating user can specify a meaningful external address for the intended recipient. As above, the electronic messaging system can use the outbound conversion table to convert the originator's internal address to an external address meaningful to the recipient. In addition, the inbound conversion table can be used to convert the external address for the message recipient to an internal address for which the electronic messaging system maintains routing information.

In the preceding embodiment, the inbound conversion table may comprise a direct-access data store keyed by external address information, with each table entry containing replacement values to convert the recipient address to an internal address. The outbound conversion table, on the other hand, is keyed by internal address information and contains replacement values to convert the originator address to an external address. The particular items of address information used as keys for these tables will depend on how the particular electronic messaging system is configured, as will the items for which replacement values are provided.

Features and advantages of the present invention are described below with reference to the drawings. Other features and advantages will be readily apparent to those skilled in the art.

BRIEF DESCRIPTION OF THE DRAWINGS

FIG. 2 is a record layout for an X.400-compliant user address.

FIG. 5 is a record layout for an embodiment of inbound and outbound conversion tables according to the present invention.

DETAILED DESCRIPTION

Figure 1:
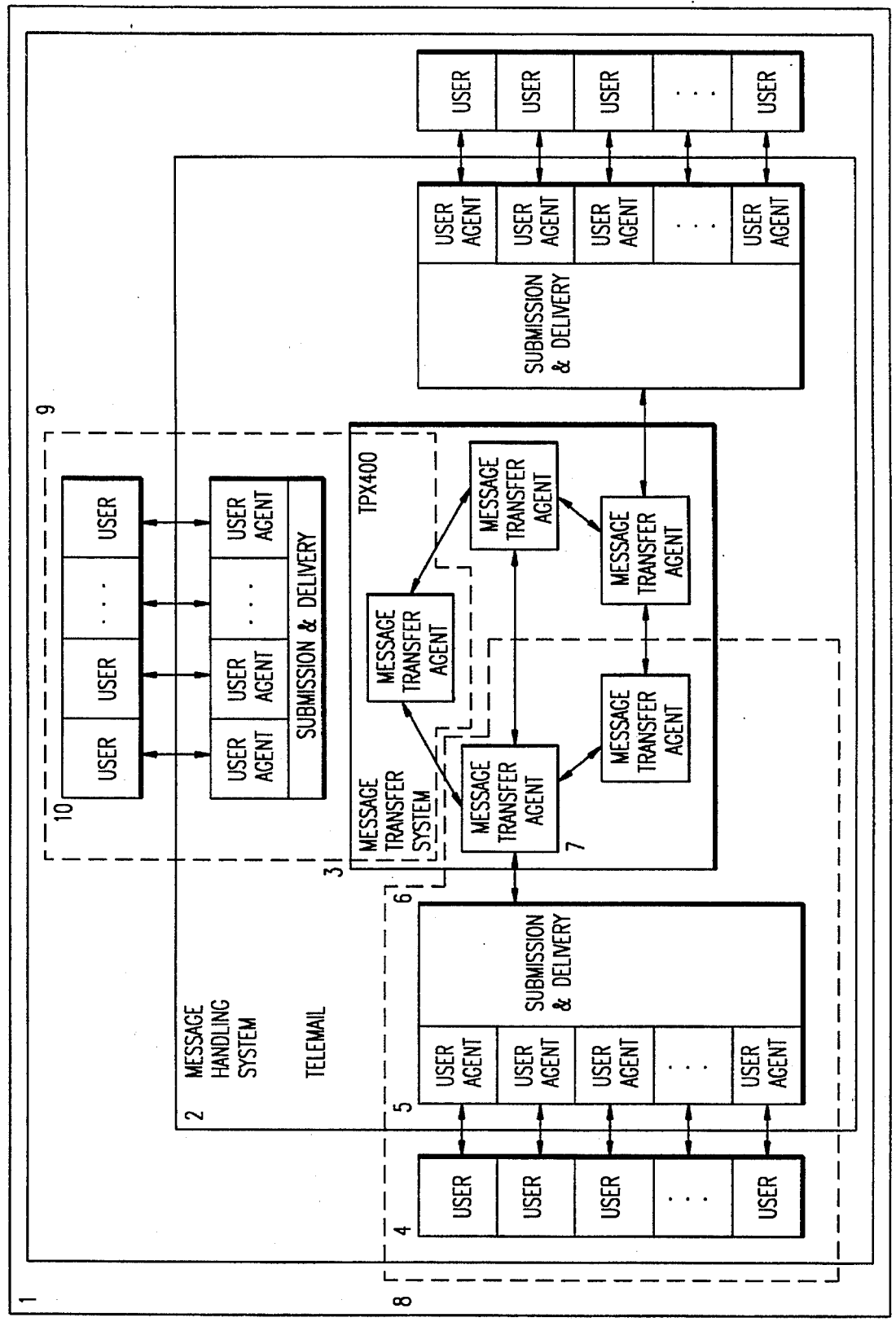
FIG. 1 is a block diagram of an electronic messaging system capable of using the method and apparatus of the present invention.

Referring to FIG. 1, an electronic messaging system 1 of a type to which the method and apparatus of the present invention are directed includes a message handling system 2 and a message transfer system 3. The message handling system 2 preferably comprises a fault-tolerant minicomputer executing software that performs message processing functions. The message handling system 2 contains several user agents 5, each of which provides message processing functions (e.g., composition, reading, printing, etc.) for one or more individual users 4. The individual user agents 5 are capable of communicating among themselves through a submission and delivery subsystem 6.

The message handling system 2 and the message transfer system 3 may communicate through electronic links between the submission and delivery subsystems 6 and the message transfer agents 7. The combination of a message transfer agent 7, a submission and delivery subsystem 6, one or more user agents 5, and the individual users 4 serviced by the user agents 5 may be referred to as an administration management domain 8 of the electronic messaging system 1. The message transfer agents 7 are responsible for routing messages between users in distinct administration management domains of the electronic messaging system 1, and between users of the electronic messaging system 1 and users of distinct (though compatible) electronic messaging systems. Each message transfer agent 7 may be selectively configured to perform customized functions. For example, a given message transfer agent 7 may be responsible for routing messages directly to and from an associated submission and delivery subsystem 6, while another message transfer agent may be responsible for intermediate routing of messages received from other systems.

To illustrate the operation of an electronic messaging system such as the one shown in FIG. 1, assume a first user 4 wishes to send a message to a second user 10. The first user logs onto the message handling system 2 from a user interface, such as a personal computer. The first user 4 then composes a message using editing facilities provided by the user agent 5 coupled to the user interface. After keying in the desired message text and specifying an address for the intended recipient using the interface, the user would request that the message handling system 2 transmit the message. The user agent 5 then transmits a digital signal embodying the message to the message transfer system 3 via a communications path or a software bridge connecting the message handling system 2 and the message transfer system 3.

Upon receiving the digital signal, the message transfer system 3 may perform some initial processing of the signal, after which it will forward the message to one of its message transfer agents 7 for routing. This initial processing will typically include a determination of whether the intended recipient of the message is another user of the electronic messaging system 1 or a user of some other compatible messaging system. Such a determination may be performed in a variety of ways. For example, the message transfer system 3 might maintain a table containing the names of all users defined to the electronic messaging system 1. If the intended recipient is included in the table, the message transfer system 3 knows the message is to be routed internally. On the other hand, if the intended recipient is not defined to electronic messaging system 1, the message transfer system 3 knows the message is to be routed externally and may process the message accordingly.

The message transfer agent 7 analyzes the signal to identify the intended recipient of the message, and then attempts to retrieve routing information for that recipient. Assuming the recipient is defined to the message transfer system 3, the message transfer agent 7 will be able to associate a telecommunications routing path with the recipient. The message transfer agent 7 will then transmit the message as a digital signal along the telecommunications routing path to the user agent 5 servicing the recipient, user 10. Upon logging onto the message handling system 2, user 10 will be notified that a message was received. User 10 may then read the message using the services of the user agent 5, or perhaps download the message to a personal computer for subsequent processing, such as printing the message. If the recipient is not defined to the message transfer system 3, the message transfer agent 7 should nonetheless be able to associate a telecommunications routing path for the messaging system servicing the intended recipient. The other system will then be responsible for ultimately routing the message to the recipient.

Each user 4 of the electronic messaging system 1 is assigned an address which enables the message transfer agent 7 linked to the administration management domain 8 to identify the routing path for transmitting messages to that user 4. Where the electronic messaging system 1 is a system complying with the CCITT's X.400 standards and protocols, these unique user addresses may be formatted as illustrated in FIG. 2.

Under the X.400 standards, an address may include attributes defined in a standard attribute list and domain-defined attributes. The standard attributes include country code, administration management domain name, X.121 address, terminal ID, private domain name, organization name, unique user agent identifier, personal name, and up to four organization units. Referring to FIG. 2, an example of an X.400-compliant user address 11 includes a country code 12, an administration management domain code 13, a private domain name 14, an organization name 15, a personal name 16, an array of organization-specific codes 17 and an array of domain-defined attributes 18. In this embodiment, the country code 12 refers to the country in which the associated user is physically located; for example, "U.S." for a United States user and "IR" for a user in Ireland. The administration management domain code 13 contains a unique identifier for the message handling system component servicing that user; for example, "USMTA" for a United States user and "IRMTA" for a user in Ireland. The organization-specific codes 17 may comprise any meaningful codes established by the system administrator, such as codes representing corporate divisions and subdivisions.

Referring again to FIG. 1, a first user 4 of the electronic messaging system 1 who wishes to send a message to a second user 10 in a different administration management domain 9 would have to specify a recipient address for the message being sent that correctly identified the country code, administration management domain code, organization codes and user name by which that second user 10 is identified within that administration management domain 9. Should this "internal" address information for the user 10 ever change (e.g., due to assignment of the user to a different administration management domain), the first user 4 would be unable to send a message to the second user 10 without knowing the new internal address. This requirement has presented a significant obstacle to so-called "global routing" of electronic messages.

Figure 3:
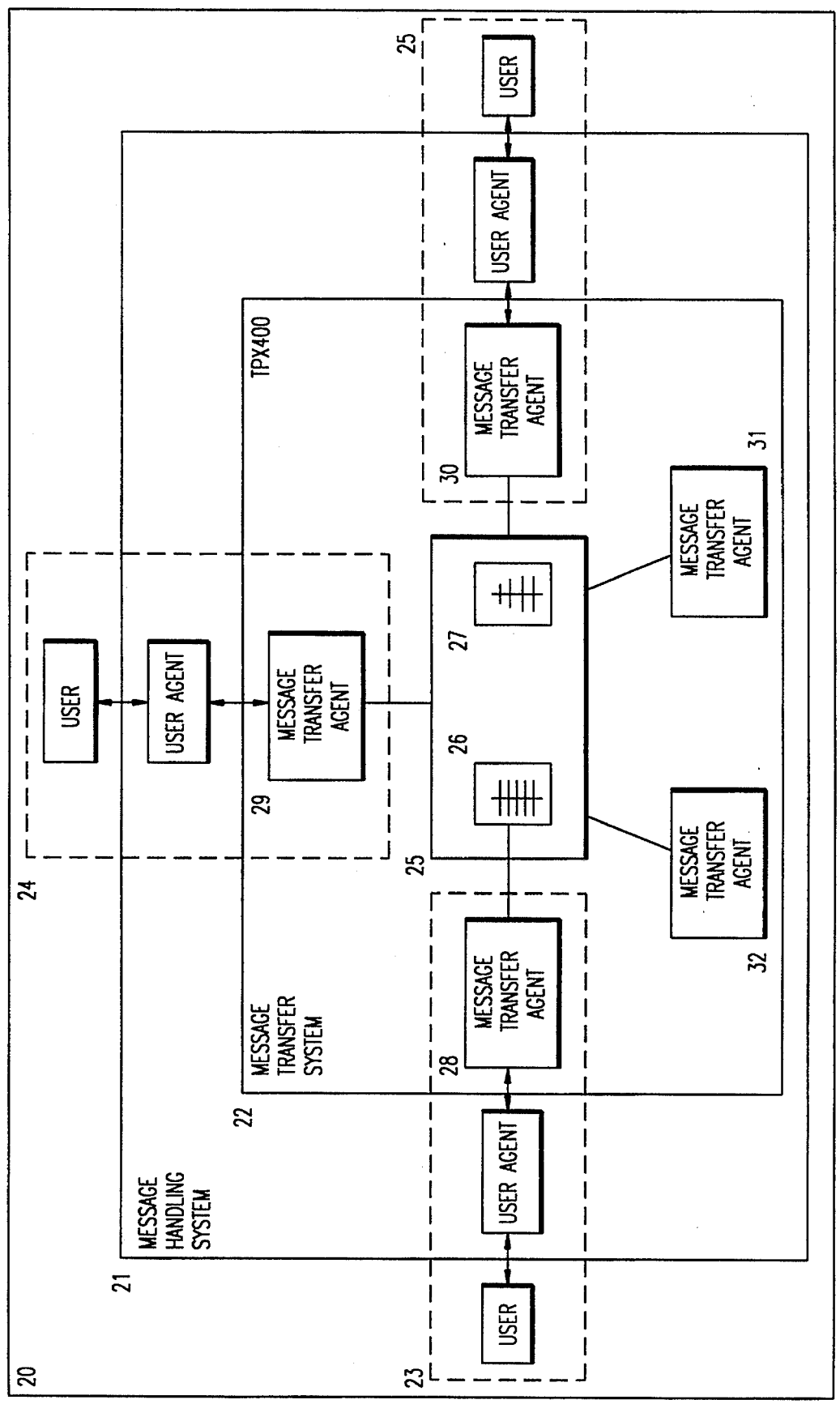
FIG. 3 is a block diagram of an embodiment of an electronic messaging system according to the present invention.

In an embodiment of the present invention shown in FIG. 3, an electronic messaging system 20 is configured essentially the same as the system described above with reference to FIG. 1. A message handling system 21 services several administration management domains 23–25, each of which provides message processing functions for a group of individual users (not shown). A message transfer system 22 includes several message transfer agents 28–32 responsible for routing messages to and from the individual users. The message transfer system 22 includes a memory 25 containing an inbound conversion table 26 and an outbound conversion table 27. The inbound conversion table enables the message transfer agents 28–32 to convert an external address specified as a recipient address on a message sent to a user of the electronic messaging system 20 to an internal address corresponding to a stored routing path for that user. Similarly, the outbound conversion table 27 enables the message transfer agents 28–32 to convert an internal address specified as an originator address on a message being sent by a system user to a corresponding external address.

The conversion tables of the embodiment in FIG. 3 enable the message transfer system 22 to route messages to electronic messaging system users independently of how those users are logically configured within the system. A user may be identified by an externally-meaningful address known to others with whom the user communicates, as well as an internally-meaningful address by which the user is identified within the system.

The present invention is especially well-suited to facilitating the routing of a message to a user of an electronic messaging system who is physically located in a country different from the country in which that user administratively resides (i.e., the country associated with the user's administration management domain). For example, in the electronic messaging system 20 of FIG. 3, assume a message is being sent to a user serviced by a first administration management domain 23. Further assume that this intended recipient is physically located in Ireland, while the ADMD 23 has been assigned country code "U.S." by virtue, for example, of the location of the minicomputer running the user agent software that provides message processing functions for the ADMD. In such a case, conformance to X.400 standards would dictate that the message contain a recipient address having a country code "IR", denoting the intended recipient's physical location. However, no routing information would exist for such a recipient address because the user is internally-identified as being in the United States; thus, the message would be undeliverable. The present invention avoids this undesirable result through the use of the inbound conversion table 26. When the signal embodying the message is received by the message transfer agent 28, the MTA searches the inbound conversion table 26 for a set of predetermined address codes matching a corresponding set of address codes in the message's recipient address. If a match is found, replacement codes are copied from the matching conversion table entry into the appropriate positions of the recipient address. Accordingly, the message will contain a valid internal address for the intended recipient. The message transfer agent 28 will then be able to retrieve information specifying a telecommunications routing path associated with that internal address and transmit the message appropriately.

The present invention also facilitates the routing of messages generated by a user of a first electronic messaging system bound for a user of a different electronic messaging system. Referring again to the embodiment shown in FIG. 3, assume a user serviced by administration management domain 23 wishes to send a message to a user of a compatible electronic messaging system. The user will specify a known external address for the recipient and the message handling system 21 may automatically include the user's address as the message originator. In this embodiment, the originator address is an internal address for the user; thus, it is desirable to convert the internal address for the originator to an external address that will be meaningful to the intended recipient. The message transfer agent 28 will search the outbound conversion table 27 for a match on predetermined codes in the originator address. Upon finding a match, the MTA 28 will use corresponding replacement values in the table entry to convert the internal originator address to an external address. The message will thus specify an externally-meaningful, X.400-compliant originator address when it reaches the intended recipient.

The present invention may also be advantageously applied to routing messages between users of the same electronic messaging system, such as when a user physically located in a first country is sending a message to another user who is assigned to the same administration management domain but who is physically located in a different country. In such a case, a message generated by a first user within administration management domain 23 will be transmitted to message transfer agent 28 for routing. In this embodiment, the message contains an internal address for the originating user, and an external address for the intended recipient specifying the country in which the recipient is physically located. Here, both the inbound conversion table 26 and the outbound conversion table 27 are used. As above, the outbound conversion table 27 is used to convert the internal originator address to an external address. Since the intended recipient is a user of the same electronic messaging system, the inbound conversion table 26 may be used to convert the external recipient address to an internal address. By using the conversion tables in this fashion, users of the electronic messaging system need only be concerned with the physical location of other system users, as opposed to having to know their administrative location.

Persons skilled in the art will recognize that the dual conversion just described may be implemented in a variety of fashions. For example, the message transfer agent could scan the inbound conversion table for a match on the recipient address for all messages being sent by users of the electronic messaging system, in which case a message being sent to a user of a different messaging system would result in no match being found in the table and therefore no conversion of the recipient address. Alternatively, the message transfer agent could search a data store of defined users for the message recipient and initiate conversion of the recipient address only if the specified recipient user is found.

Figure 4:
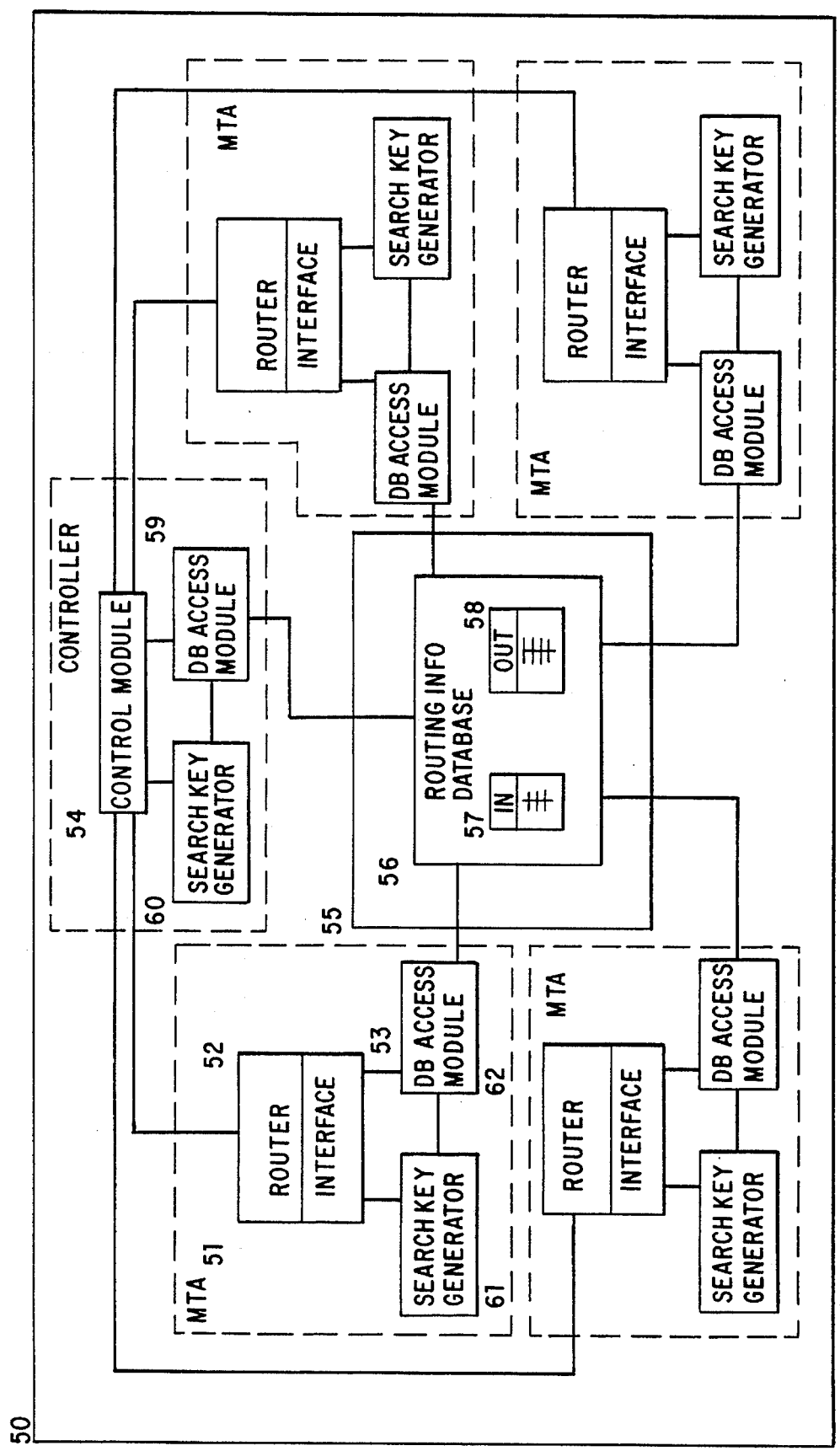
FIG. 4 is a block diagram of an embodiment of a message transfer system according to the present invention.

FIG. 4 shows an embodiment of a message transfer system 50 adapted to perform the method of the present invention. The message transfer system 50, preferably comprising a minicomputer such as the "DATA GENERAL AVIION" Model 5250 workstation running a "UNIX" operating system, may be adapted to communicate with a message handling system (not shown) through a software bridge (not shown). The message transfer system 50 is responsible for providing message switching functions for an electronic messaging system.

As in FIG. 1 and FIG. 3, the message transfer system 50 of FIG. 4 includes a plurality of message transfer agents 51, with each message transfer agent 51 including a router 52 and an interface 53 for communicating with external modules (e.g., a user agent, other MTAs, a controller). A control module 54 is coupled to each of the message transfer agents 51 and coordinates the activities of the message transfer system 50. The message transfer system 50 also includes a memory 55 containing a routing information database 56, which in turn contains an inbound conversion table 57 and an outbound conversion table 58. A database access module 59 is adapted to retrieve various types of records from the routing information database 56 using search keys built by a search key generator 60. A similar search key generator 61 may be used to provide keys for use by a second database access module 62 to retrieve table entries from the conversion tables 57, 58.

Referring now to FIG. 5, an embodiment of an inbound conversion table 35 includes entries containing address keys 34 comprising an external country code 36 and an external administration management domain code 37. An internal country code 39 and an internal administration management domain code 40 are paired with each address key 34. Similarly, an embodiment of an outbound conversion table 41 includes entries containing address keys 45 comprising an internal country code 42 and an internal organization code 44. An external country code 46 and an external administration management domain code 47 are paired with each address key 45. The inbound conversion table 35 and the outbound conversion table 41 preferably comprise direct-access datasets keyed by the address keys 34 and 45. Alternatively, the tables could comprise sequential datasets preferably sorted by address key to facilitate searching by, for example, a binary search technique as is well-known in the art. Multiple views of a single conversion table could also be used for purposes of both inbound and outbound conversions depending on the requirements of the specific electronic messaging system.

Examples of inbound and outbound conversion tables according to the embodiment of FIG. 5 are shown below and will be used to illustrate the operation of the present invention.

TABLE 1

| INBOUND CONVERSION | |
|---|---|
| Address Key | Replacement Code |
| USA/TM | USA/TM |
| JAPAN/TM | USA/TM |
| MEXICO/TM | USA/TM |

TABLE 2

| OUTBOUND CONVERSION | |
|---|---|
| Address Key | Replacement Code |
| USA/EXXON | USA/TM |
| USA/SONY | JAPAN/TM |
| USA/PEMEX | MEXICO/TM |

The values in Table 1 and Table 2 correspond to an electronic messaging system wherein a single administration management domain, denoted "TM" and located in the United States (country code "USA"), services users in three different countries: "USA", "JAPAN" and "MEXICO". These users are members of organizations "EXXON", "SONY" and "PEMEX", respectively.

The method and apparatus of the present invention enable a message transfer agent of an electronic messaging system to successfully route a message specifying a recipient address with a country code different from the country in which the intended recipient is administratively located. For example, assume a message is received by a message transfer agent specifying the following X.400-compliant recipient address:

C:MEXICO, A:TM, O:PEMEX, N: PEDRO GONZALES where "C" is a country code, "A" is an administration management domain code, "O" is an organization code and "N" is a user name. Referring to Table 1, formatted as in FIG. 5, the message transfer agent will search the inbound conversion table for an entry having an address key equal to the country and ADMD codes in the above address. In this case, the inbound conversion table is searched for an address key equal to "MEXICO/TM". Here the third entry in the table would produce a match. The message transfer agent would then replace the country code and administration management domain codes with the corresponding replacement codes values from the table entry, resulting in a recipient address as follows:

C:USA, A:TM, O:PEMEX, N:PEDRO GONZALES

The inbound conversion table entries are defined such that the converted recipient address is a valid internal address for the recipient. Accordingly, the message transfer agent should be able to retrieve routing information for the recipient and forward the message.

The method and apparatus of the present invention also facilitate routing of a message sent by a user of a first electronic messaging system to a user of another electronic messaging system. As discussed above with reference to FIG. 1, a user prepares a message using facilities provided by a user agent. The user agent will typically include the internal address for the user as the originator address in the message. Thus, a message might specify the following originator address:

C: USA, A:TM, O:SONY, N:HIRO NIKI where "C" is a country code, "A" is an ADMD code, "O" is an organization code and "N" is the originator's name. This message would be forwarded to the message transfer agent associated with the user agent for routing; however, it is desirable to convert the internal address for the originator to an externally-meaningful address. Accordingly, the message transfer agent searches the outbound conversion table of Table 2 for an entry having an address key equal to the country code and organization code from the originator address (i.e., "USA/SONY"). A match exists in the second table entry. The internal originator address will thus be converted to an external address by replacing the country code and ADMD code as follows:

C: JAPAN, A:TM, O:SONY, N:HIRO NIKI

The message sent to the recipient will now specify an originator address that is externally-meaningful; that is, it identifies the originator according to how that user is known to the outside world, rather than how that user is internally identified by the electronic messaging system.

The inbound conversion table may also be used to convert an external recipient address to an internal address. This type of conversion is desirable when a message is being sent between users residing in a single administration management domain, but where the intended recipient is physically located in a country different from that associated with the ADMD. For example, assume a message specifies originator and recipient addresses as follows:

Originator

C:USA, A:TM, O:PEMEX, N:PEDRO GONZALES

Recipient

C: JAPAN, A:TM, O:SONY, N:HIRO NIKI

In this example, as in the previous example, the originator address is an internal address entered automatically by the user agent servicing the originating user. The recipient address, on the other hand, is an external address for the recipient that was entered by the originator. With the method and apparatus of the present invention, there is no need for the originator to know that the recipient resides in the same administration management domain with the same country code as the originator. By the same process as that discussed above, the message transfer agent will use the outbound conversion table of Table 2 to convert the internal originator address (address key equals "USA/PEMEX") to an external address, and the inbound conversion table of Table 1 to convert the external recipient address (address key equals "JAPAN/TM") to an internal address. A match for the address key of the originator address will be found in the third entry of the outbound conversion table, while a match for the address key of the recipient address will be found in the second entry of the inbound conversion table. The resulting converted addresses are shown below.

Originator

C:MEXICO, A:TM, O:PEMEX, N:PEDRO GONZALES

Recipient

C: USA, A:TM, O:SONY, N:HIRO NIKI

The message transfer agent may then transmit the message to the intended recipient, and the intended recipient will receive a message specifying an externally-meaningful originator address.

While the present invention has been described with reference to specific embodiments, it will be apparent to those skilled in the art that many modifications and variations are possible. Accordingly, the present invention embraces all alternatives, modifications and variations that fall within the spirit and scope of the appended claims, as well as all equivalents thereof.

What is claimed is:

1. A method for routing a message encoded in a signal received by an electronic messaging system, the message comprising an originator address identifying a sending user, a recipient address identifying a receiving user, and a message text, the method comprising the steps of:

(a) searching an address in the message being routed for a predetermined address code; and (b) converting the address prior to routing the message by replacing a first address code with a second address code if the predetermined address code is found.

2. The method of claim 1 wherein the step of searching an address further comprises searching the originator address for a predetermined internal address code comprising an element of an internal address for the sending user, the internal address corresponding to a routing path for that user.

3. The method of claim 2 wherein the first address code comprises an internal address code and the second address code comprises an external address code, the external address code comprising an element of an external address for the sending user, the external address identifying the sending user to other users.

4. The method of claim 1 wherein the step of searching an address further comprises searching the recipient address for a predetermined external address code comprising an element of an external address for the receiving user, the external address identifying the receiving user to other users.

5. The method of claim 4 wherein the first address code comprises an external address code and the second address code comprises an internal address code, the internal address code comprising an element of an internal address for the recipient user, the internal address being associated with a routing path for that user.

6. A method for routing a message encoded in a signal received by an electronic messaging system, comprising an originator address, a recipient address and a message text, the method comprising the steps of:

(a) maintaining an internal address identifying a routing path for a user of the electronic messaging system, the internal address comprising at least one internal address code;

(b) maintaining an association between an internal address code and an external address code in a memory of the electronic messaging system;

(c) locating a predetermined internal address code in the originator address of a message being routed; and (d) replacing the predetermined internal address code by an associated external address code prior to routing the message.

7. The method of claim 6 wherein the step of maintaining an association between an internal address code and an external address code comprises maintaining a conversion table of entries uniquely identified by a set of internal address codes.

8. The method of claim 7 further comprising the steps of locating a predetermined external address code in the recipient address of the message being routed and replacing the predetermined external address code in the recipient address by an associated internal address code prior to routing the message.

9. The method of claim 8 wherein the step of maintaining an association between an internal address code and an external address code further comprises maintaining a second conversion table of entries uniquely identified by a set of external address codes.

10. A method for routing a message received by an electronic messaging system, the message including a recipient address having a plurality of address codes and a message text, the method comprising:

(a) generating a search key from the recipient address comprising a subset of the plurality of address codes corresponding to predetermined elements of the recipient address;

(b) searching an inbound conversion table associating a set of internal address codes with a set of external address codes for a table entry including a set of external address codes corresponding to the search key; and (c) converting the recipient address to an internal address using the set of internal address codes from the inbound conversion table.

11. The method of claim 10 wherein the inbound conversion table comprises a direct-access data set accessible by the set of external address codes.

12. The method of claim 10 wherein the inbound conversion table comprises a data set sorted in external address code order.

13. The method of claim 12 wherein the step of searching the inbound conversion table comprises a binary search of the data set.

14. A message transfer device for routing a signal embodying a message in an electronic messaging system, the electronic messaging system including a memory and a routing information database stored therein that associates an internal address for each system user with a routing path, the message transfer device comprising:

(a) a conversion table stored in the memory of the electronic messaging system, the conversion table including at least one entry associating an internal address code with an external address code, the internal address code comprising an element of an internal address and the external address code comprising an element of an external address, the external address identifying a user to other users;

(b) a key generator capable of formatting a search key comprising a set of internal address codes parsed from predetermined positions of an originator address included in a message to be routed;

(c) a table access module adapted to retrieve an entry from the conversion table having address codes equal to the search key; and (d) a router module adapted to convert the address included in the message to be routed by replacing one of the set of address codes by an associated address code from a retrieved conversion table entry prior to routing the message.

15. The message transfer device of claim 14 wherein the conversion table comprises entries that are identified by a unique set of internal address codes.

16. A message transfer device for routing a signal embodying a message in an electronic messaging system, the electronic messaging system including a memory and a routing information database stored therein that associates an internal address for each system user with a routing path, the message transfer device comprising:

(a) a conversion table stored in the memory of the electronic messaging system, the conversion table including at least one entry associating an internal address code with an external address code, the internal address code comprising an element of an internal address and the external address code comprising an element of an external address, the external address identifying a user to other users;

(b) a key generator capable of formatting a search key using external address codes parsed from a recipient address specified in the message to be routed;

(c) a table access module adapted to retrieve an entry from the conversion table having address codes equal to the search key; and (d) a router module adapted to convert the address included in the message to be routed by replacing one of the set of address codes by an associated address code from a retrieved conversion table entry prior to routing the message.

17. The message transfer device of claim 16 wherein the conversion table comprises entries that are identified by a unique set of external address codes.

18. A message transfer device for routing a signal embodying a message in an electronic messaging system, the electronic messaging system including a memory and a routing information database stored therein that associates an internal address for each user with a routing path, the message comprising an originator address, a recipient address and a message text, the message transfer device comprising:

(a) a conversion table stored in the memory of the electronic messaging system, the conversion table including at least one table entry associating an internal address code with an external address code, the internal address code comprising an element of an internal address and the external address code comprising an element of an external address, the external address identifying a user to other users;

(b) a key generator capable of formatting a first search key comprising a set of address codes parsed from predetermined positions of the originator address and a second search key comprising a set of address codes parsed from predetermined positions of the recipient address;

(c) a conversion table access module adapted to retrieve a first table entry corresponding to the first search key and a second table entry corresponding to the second search key; and (d) a control module adapted to convert the originator address to an external address and the recipient address to an internal address using address codes from the first and second table entries.

19. The message transfer device of claim 18 wherein the conversion table comprises an inbound conversion table and an outbound conversion table, the inbound conversion table associating external address codes with corresponding internal address codes and the outbound conversion table associating internal address codes with corresponding external address codes.

20. The message transfer device of claim 19 wherein the address codes parsed from the originator and recipient addresses correspond to elements of an address having a predetermined format in which each of a plurality of address codes represents a unique degree of specificity.

21. A message transfer device for routing a message in an electric messaging system including a memory and a routing information dataset stored therein that associates an internal address for each user with a routing path, the message comprising an originator address including at least one internal address code, a recipient address including at least external address code, and a message text, the message transfer device comprising:

(a) an outbound conversion table stored in the memory of the electronic messaging system, the outbound conversion table including at least one table entry associating an internal address code with a corresponding external address code;

(b) an inbound conversion table stored in the memory of the electronic messaging system, the inbound conversion table including at least one table entry associating an external address code with a corresponding internal address code;

(c) a search key generator capable of generating a first search key comprising a set of address codes parsed from predetermined positions of the originator address and a second search key comprising a set of address codes parsed from predetermined positions of the recipient address;

(d) a conversion table access module adapted to retrieve an entry from the outbound conversion table identified by the first search key and an entry from the inbound conversion table identified by the second search key; and (e) a router module adapted to replace an internal address code in the originator address by an external address code from the retrieved outbound conversion table entry and to replace an external address code in the recipient address by an internal address code from the retrieved inbound conversion table entry.

22. The message transfer device of claim 21 wherein the inbound and outbound conversion tables comprise direct-access data sets.

* * * * *

UNITED STATES PATENT AND TRADEMARK OFFICE
CERTIFICATE OF CORRECTION

PATENT NO. : 5,493,564
DATED : 20 February 1996
INVENTOR(S) : John A. Mullan

It is certified that error appears in the above-indentified patent and that said Letters Patent is hereby corrected as shown below:

| Column | Line | |
|--------|------|---|
| 2 | 43 | Change "(CCITIT)" to --(CCITT)--. |
| 3 | 30 | Change "CCITF's" to --CCITT's--. |
| 12 | 34 | Before "comprising" insert --the message--. |
| 14 | 61 | Change "dataset" to --database--. |

Signed and Sealed this

Sixth Day of August, 1996

Attest:

BRUCE LEHMAN

Attesting Officer

Commissioner of Patents and Trademarks